Figure 3:
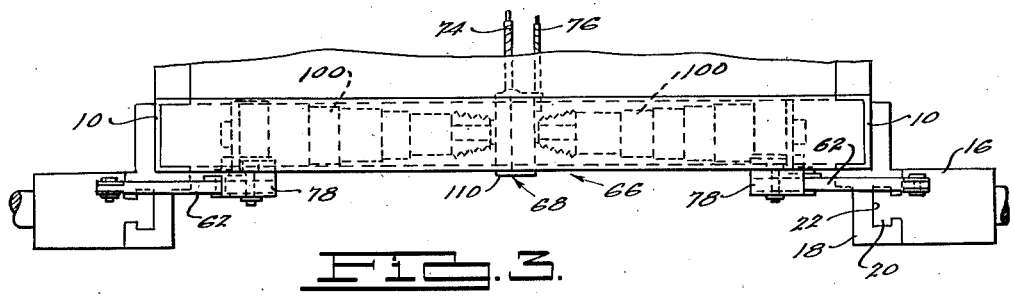

Oct. 7, 1952           H. V. TUTTON           2,613,115
                   TRACK-LAYING TRACTOR
Filed March 15, 1947                    2 SHEETS—SHEET 1
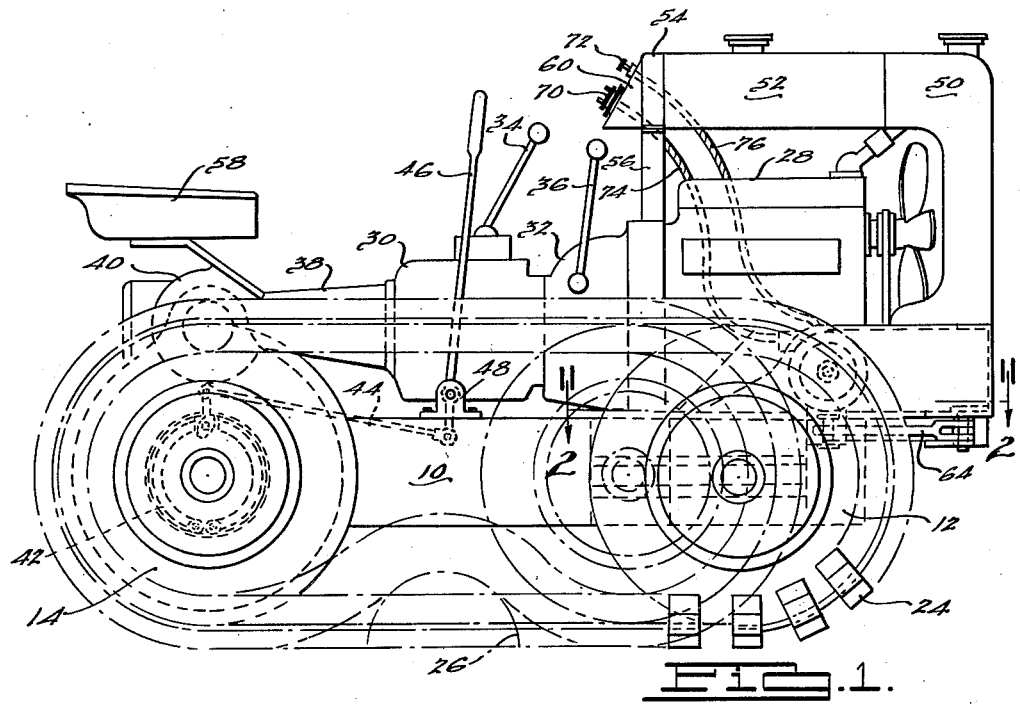
INVENTOR.
Harry V. Tutton
BY
Harness, Dickey & Pierce
ATTORNEYS.

Oct. 7, 1952      H. V. TUTTON      2,613,115

TRACK-LAYING TRACTOR

Filed March 15, 1947      2 SHEETS—SHEET 2

INVENTOR.
Harry V. Tutton.
BY
ATTORNEYS.

Patented Oct. 7, 1952

2,613,115

UNITED STATES PATENT OFFICE 2,613,115

TRACK-LAYING TRACTOR

Harry V. Tutton, Detroit, Mich., assignor to Sherman Products Inc., Royal Oak, Mich.

Application March 15, 1947, Serial No. 734,946

9 Claims. (Cl. 305—8)

This invention relates to track-laying tractors of the type disclosed in the copending application of Lewis B. Merrill, Serial No. 529,087, which was filed April 1, 1944 and matured into Patent No. 2,452,671 on the 2nd day of November, 1948.

An important object of the present invention is to provide a track-laying tractor having two or more wheels at opposite sides thereof which carry the endless tracks and wherein one of the endmost wheels at each side of the vehicle is movable longitudinally of the latter a distance sufficient to form considerable slack in the endless track associated therewith.

Another object of the invention is to provide novel means for urging said movable wheels in a direction to tauten the endless tracks so that the latter normally are stretched tightly around the wheels but wherein each movable wheel can slide longitudinally of the vehicle to provide slack in its respective track in the event the latter passes over an obstruction such as a rock, log, or stump.

Still another object of the invention is to provide a track-laying tractor of the above-mentioned character wherein the endless tracks and their adjuncts are so constructed and arranged that the weight of the vehicle is never supported entirely by the lower runs of the tracks regardless of the type of obstruction traversed by the vehicle.

Yet another object of the invention is to provide a track-laying tractor of the above-mentioned character wherein the endless tracks tend to wrap around any obstruction traversed thereby thus relieving the tracks of excessive strain or stresses and affording additional purchase or traction for the vehicle.

A further object of the invention is to provide a novel spring system or motor for controlling the movable wheels of the tractor, which spring system is adjustable to vary the initial tension normally imposed on the endless tracks.

A still further object of the invention is to provide a novel spring system of the above-mentioned character which is uniquely constructed to afford progressively increasing resistance as the wheels move to form slack in the endless tracks.

A yet further object of the invention is to provide a spring system of the above-mentioned character wherein the initial adjustments can be made manually during operation of the vehicle.

Other objects and advantages of the invention will be apparent during the course of the following description.

Figure 4:
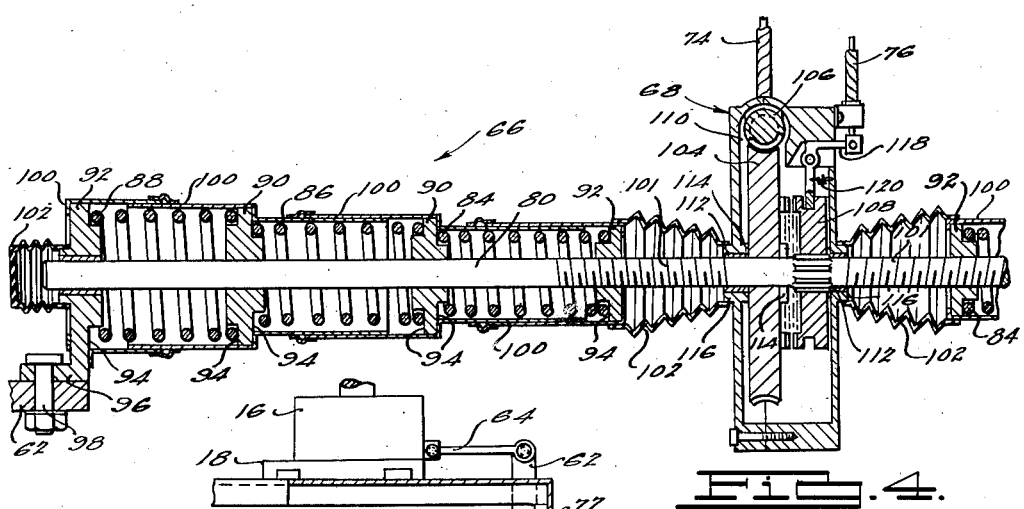
Figure 5:
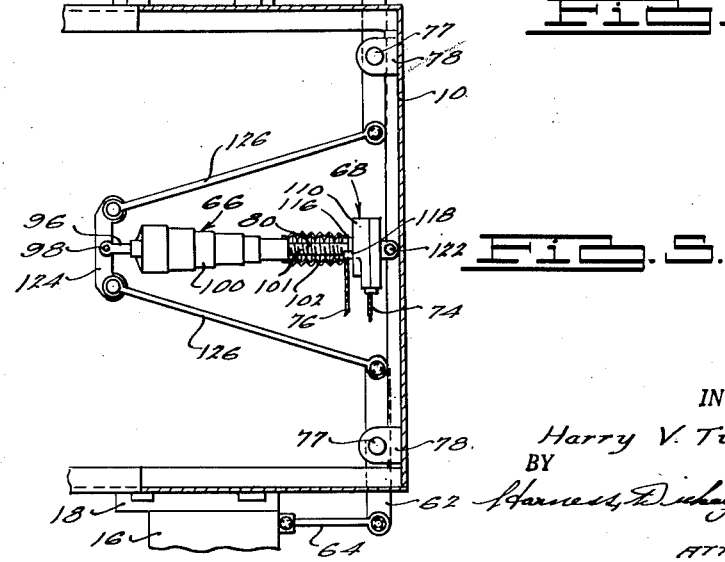

In the drawings forming a part of this specification and wherein like numerals are employed to designate like parts throughout the same, Fig. 1 is a side elevational view of a track-laying tractor embodying the invention, Fig. 2 is a fragmentary, transverse sectional view taken on the line 2—2 of Fig. 1 and showing a preferred spring compensating system for controlling the movable wheels of the vehicle, Fig. 3 is a fragmentary, front elevational view looking in the direction of the arrows 3—3 in Fig. 2, Fig. 4 is an enlarged, fragmentary, vertical sectional view taken on the line 4—4 of Fig. 2, and Fig. 5 is a transverse sectional view similar to Fig. 2 but showing a modified spring compensating system.

While the essence of the present invention is embodied in the spring compensating system or motor which controls the movable wheels of the tractor, a brief description of the vehicle is first given in order to provide a proper setting for the real invention. In this connection, however, it is to be understood that the tractor here shown is given merely by way of illustration and not by way of limitation. Except for the feature that one track-carrying wheel at each side of the vehicle must be movable longitudinally of the latter a distance sufficient to form considerable slack in the tracks, the construction and operation of the tractor may vary considerably.

The tractor here shown by way of illustration has a rigid, generally rectangular frame 10 which conveniently may be formed from any suitable type of structural member and is here shown formed of channel pieces welded or otherwise suitably fastened together (Fig. 3). At each side of the frame 10 are front and rear track-carrying and supporting wheels 12 and 14. These wheels may be of any suitable type or construction and are here illustrated as conventional rubber-tired wheels.

According to the present invention one wheel in each pair must be movable for a substantial distance longitudinally of the vehicle, and the other wheel in each pair preferably is longitudinally fixed. In the tractor here shown by way of illustration, the two front wheels 12 are movable longitudinally along the frame 10 and the two rear wheels 14 are stationary on the frame. In this connection, conventional fixed journals or mountings (not shown) are provided for the rear wheels 14, but the front wheels 12 are carried by slides 16. The latter engage flatly at the inner sides thereof against fixed guide blocks 18 which blocks are fastened solidly to and depend from the side frame members. The flat outer faces of guide blocks 18 provide solid stationary bearing surfaces for the slides 16 and, as best shown in Fig. 3, the latter are formed with horizontally projecting T-shaped guides 20 which fit snugly but slidably in correspondingly shaped guideways 22 in the guide blocks.

An endless track 24, which may be of conventional construction, is carried by each pair of wheels 12 and 14; and, when the slides 16 are positioned forwardly in the guide 18, the front wheels 12 thrust against the tracks 24 and hold the latter taut. However, when slides 16 occupy rearward positions in guide blocks 18 slack is formed in the endless tracks 24, as shown by broken lines in Fig. 1.

As suggested, it is a feature of this invention that slides 16 have a relatively long travel so that considerable slack can be formed in endless tracks 24. For example, when the front wheels 12 move from the full to the broken line position in Fig. 1, sufficient slack is formed in endless tracks 24 so that the latter extend over and, in effect, wrap around an obstruction 26 traversed by the vehicle. By reason of this unique operation, both wheels 12 and 14 are available at all times to support the weight of the vehicle. Manifestly, if the wheels 12 and 14 were longitudinally fixed or had only slight movement as is usually provided for taking up slack in the tracks due to natural stretching or wear, one or both of the wheels 12 and 14 would be lifted entirely off the ground by the obstruction 26; and, when this occurred, all or a major portion of the weight of the vehicle would be supported solely by the bottom runs of the tracks. This phenomenon causes frequent breakage of tracks 24 in conventional vehicles of this type but is obviated by the present construction. Also, by providing for considerable slack in the tracks 24, the area of contact between the latter and the obstruction 26 is considerably greater than if the tracks are stretched tautly between two fixed or relatively fixed wheels according to conventional practice. The increased area of contact affords greater traction and thus permits the vehicle to pass more easily over the obstruction.

The operating and control mechanism for the tractor may be conventional and comprise no part of the present invention. An internal combustion engine 28 is shown on the forward end of the frame 10, which engine drives the usual change speed transmission 30 through a conventional type clutch, designated generally by the numeral 32. The transmission 30 is controlled by the usual hand lever 34 and the clutch 32 is actuated by the usual control lever 36. At the rearward end of the transmission 30 is a drive shaft housing 38 which carries the usual drive shaft (not shown) and the latter drives the usual differential gearing (not shown) in the housing 40. It is to be understood that the differential gearing in housing 40 has the usual driving connection with the rear wheels 14.

Steering is accomplished by braking one or the other of rear wheels 14 and for this purpose each rear wheel is equipped with a conventional type wheel brake mechanism designated generally by the numeral 42. In the vehicle here shown by way of illustration, each of the brake mechanisms 42 is connected by a rod 44 to a hand lever 46 and the latter is supported for movement about a horizontal pivot by a bracket 48 which is bolted or otherwise fastened to the frame 10.

A conventional radiator 50 is mounted on the frame 10 ahead of the engine 28 and is connected to the latter in the conventional manner. The usual fuel tank 52 is mounted between the upper end of radiator 50 and a dash structure 54 which, in turn, is supported by the frame 10 through the medium of suitable upright supporting members 56. The usual seat 58 is provided for the operator and an instrument panel 60 carried by the dashboard structure 54 is readily accessible to the operator during operation of the vehicle.

According to the present invention, the mechanism for constantly urging the front wheels 12 away from the corresponding rear wheels 14 to maintain endless tracks 24 normally in taut condition and for controlling rearward movement of the front wheels to provide slack in the endless tracks when the vehicle traverses an obstruction, comprises a pair of pivoted levers 62 which are mounted on the frame 10 at opposite sides of the vehicle. The levers 62 are connected to respective slides 16 by rods 64 and to a spring motor designated generally at 66. Means is provided for maintaining the spring motor 66 normally under tension and the arrangement is such that the latter acts simultaneously on both slides 16 through the medium of levers 62 and links 64 to maintain a constant forward pressure against the front wheels 12. As a result, the endless tracks 24 normally are taut; but, if the vehicle passes over an obstruction 26 which ordinarily would leave one or both of the wheels 12 or 14 temporarily off the ground, the slides 16 are free to move rearwardly against the resilient action of the spring motor 66 and thus prevent excessive or destructive stresses from being developed in the tracks.

In practice, it has been found desirable to adjust the tension normally maintained on the tracks 24 according to the terrain being traversed at the time. With this end in view, the spring motor 66 preferably is equipped with a manually operated device, designated generally at 68, for adjusting the preload tension of the spring motor and the device 68 is actuated by suitable control means 70 and 72 on the instrument panel 60 through the medium of Bowden or similar type control cables 74 and 76.

In the form of the invention shown in Figs. 2–4, the levers 62 are in the form of triangular plates, which plates are fastened at one corner thereof to the frame 10 by pivots 77 and brackets 78. As best shown in Fig. 3, the levers 62 are disposed entirely below the frame 10 and a second corner thereof projects laterally of the frame to connect with rods 64. The third or remaining corners of levers 62 are pivotally attached to opposite ends of the spring motor 66.

Broadly, the spring motor 66 may be any type of compression spring that can be physically interposed between the two levers 62; however, in order that resistance to rearward movement of front wheels 12 may be maintained properly and increased progressively without overloading the control springs, the construction shown in the drawing and particularly in Fig. 4 is preferred. This construction comprises a free-floating rod-like supporting member 80 which carries two series of compression springs at opposite ends thereof. Each series is here shown as comprising three separate springs 84, 86 and 88, which springs increase progressively in size and strength from one end of the series to the other, are arranged in end-to-end relation and separated by suitable spacers 90. One series of springs is shown in detail in Fig. 4. End plates 92 also are provided at opposite ends of the series for confining the respective springs 84, 86 and 88.

Spacers 90 and end plates 92 snugly fit the support 80 and preferably are formed with annular peripheral recesses 94 which seat the ends of the springs and hold the same generally concentric to the support. In order to hold the springs under tension the inner end plates 92 are stationary on support 80; however, the spacers 90 and the outermost end plates 92 are freely slidable on the support. Also, it will be observed that the outermost end plates are provided with integral brackets 96 which are fastened to the levers 62 by pivots 98. Spacers 90 and end plates 92 carry rotatably fixed but mutually telescoping casings 100 which surround and shield the springs 84, 86 and 88; and the end plates additionally are equipped with bellows-type seals 102 which accommodate the projecting portions of the support 80 and prevent dirt from gaining access into the casings 100.

As a result of the above construction and arrangement of parts, the front wheels 12 are moved rearwardly by endless tracks 24 when the vehicle traverses an obstruction 26. Rearward movement of the wheels 12 rocks levers 62 about pivots 77 and acts through the outer end plates 92 to compress springs 84, 86 and 88. Manifestly, since both the outer end plates 92 and the spacers 90 are freely slidable on the support 80, the load imposed on the spring motor 66 is taken first by the two smallest springs 84; and, as the load on the motor increases, the load is progressively taken up by the larger springs 86 and 88. In this manner, resistance to movement of the wheels 12 increases gradually as the load increases and possibility of overloading of any spring in the system is reduced to a minimum.

As the rear wheels 14 move onto the obstruction 26 and the weight of the vehicle is removed from the lower runs of tracks 24 the spring motor 66 gradually advances the front wheels and maintains the endless tracks 24 substantially uniformly taut at all times.

Manifestly, the operation is the same regardless whether the front wheels 12 are retracted individually or concomitantly. If only one track 24 passes over an obstruction, such as a rock or stump, only the front wheel 12 associated with such track is retracted and the load is transmitted to the spring motor 66 from only one end thereof. In this connection, however, it will be noted that the entire spring motor 66 including support 80 is mounted for free movement transversely of the vehicle; consequently, as the front wheel 12 is retracted, the load is transmitted simultaneously to both series of springs in the motor 66. Thus, the load is distributed substantially equally between the two sets of springs and the latter operate in unison to control movement of the single wheel 12. On the other hand, if the two tracks 24 simultaneously encounter an obstruction, such as a log or the like, which retracts both front wheels 12 in unison and imposes a load on the spring motor 66 substantially simultaneously from both ends thereof, all of the springs in the motor are equally available to assume the load and to control the front wheels 12. Thus, the device operates in substantially the same manner regardless of whether the wheels 12 are retracted individually or in unison or whether they are retracted equal distances or at the same rate.

As suggested, it is desirable though not essential that means be provided for adjusting the initial tension or preload normally maintained on springs 84, 86 and 88 and that this means be adapted to regulate the tension while the vehicle is being operated. According to the present invention, this operation is performed by the device 68 which comprises threaded connections 101 between support 80 and the inner plates 92, a worm gear 104 loosely mounted on the support between such threaded connections, a worm 106 for driving the worm gear and a clutch 108 for selectively attaching the worm gear to the support. The worm gear 104, worm 106 and clutch 108 are all enclosed in a housing 110 and the latter is equipped with suitable bushings 112 which snugly but rotatably receive the support 80. Spacers 114 at opposite sides of the worm gear 104 hold the latter from the internal walls of the housing 110 and in proper mesh with the worm 106. Also, it will be observed that the housing 110 is formed with hubs 116 which extend axially along the support 80 and carry the inner ends of the adjacent bellows seals 102, whereby the latter keep dirt and the like from the gearing and other mechanism in the housing. Manifestly, if clutch 108 is engaged with gear 104, rotation imparted thereto by worm 106 is transmitted to support 80, and rotation of the latter moves the inner plates 92 axially along the threaded portions 101. Thus, the tension on springs 84, 86, and 88 is increased or reduced depending on which way the support 80 is rotated. Also, it will be readily apparent that the energy normally stored in the springs 84, 86 and 88 can be released substantially instantaneously by disengaging the clutch 108 from the worm gear 104.

The flexible control cable 74 is adapted for rotatably driving the worm 106, and the manual control 70 for the cable preferably is in the form of a small crank, as best shown in Fig. 1. The flexible control cable 76 is adapted to transmit axial or longitudinal movement and it is connected to the clutch 108 by a bell crank lever 118. Clutch 108 is held normally retracted or disengaged from worm gear 104 by a spring 120, and manual control 72 for the cable 76 is in the form of a small push button. Thus, the operator can engage or disengage the clutch 108 merely by pushing or pulling the control member 72.

In operation of the mechanism for selectively preloading the spring motor 66, support 80 is rotated either to the right or to the left by engaging the clutch 108 and manually actuating the control 70. As the support 80 rotates, the inner end plates 92 advance or retract on the threaded portions 101 depending on which direction support 80 is rotated; and, since the outer end plates 92 are held relatively stationary by levers 62, such movement of the inner plates changes the distance between the end plates and thus varies the preload tension on springs 84, 86, and 88. Also, it will be readily apparent that the preload tension imposed on the springs can be regulated by the operator during actual operation of the tractor.

The form of the invention shown in Fig. 5 is identical to the form hereinabove described except that the spring motor 66 is equipped with only a single series of springs 84, 86 and 88 and is mounted so that the single spring system controls both of the front wheel slides 16. In this form of the invention, the housing 110 is pivoted at 122 to a front transverse member of the frame 10 and sufficient clearance is provided between the housing and the frame so that the motor can rock back and forth about the pivot 122. The bracket 96 at the distal or swinging end of the spring motor is pivoted substantially midway between the ends of a lever 124, and the ends of the latter are pivoted to respective levers 62 by connecting rods 124. In this form of the invention levers 62 preferably are in the form of straight bars which are pivoted at substantially the middle thereof to brackets 78.

In operation the latter form of the invention is quite similar to the form first described. If both front wheels 12 retract in unison, the spring motor 66 is compressed by forces transmitted simultaneously against both ends of lever 124. As the vehicle passes over the log or other obstruction causing retraction of the wheels 12, the spring motor 66 expands to advance the wheels to their initial position exactly in the manner described in connection with the first form of the invention. On the other hand, if only one front wheel 12 is retracted, the lever 62 and rod 126 associated with such wheel acts against the lever 124 to compress the spring motor 66; while, the lever 62 and rod 126 associated with the other front wheel 12 remains stationary. In order to compensate for movement of the first-mentioned lever 62 and rod 126, the housing 110 rocks about pivot 122 and thus adjusts or compensates automatically to the pull of the retracting wheel 12. Also, the spring motor 66 automatically rights itself and returns the retracted wheel 12 to its initial or advanced position when the vehicle passes over the obstruction.

It is to be understood that the forms of the invention herewith shown and described are to be taken as preferred examples of the same and that various changes in the size, shape and arrangement of parts may be resorted to without departing from the spirit of the invention or the scope of the appended claims.

Having thus described the invention, I claim:

1. In a tractor vehicle, a pair of vehicle supporting wheels at each side of the vehicle, an endless track trained over and around each pair of wheels with its lower run unsupported between said wheels, a mounting for one wheel in each pair permitting bodily movement thereof longitudinally of said vehicle and relative to the other wheel with which it is associated, mechanism for urging said movable wheels constantly away from the other of said wheels, said mechanism including levers pivoted on the vehicle and connected to said movable wheel mountings in such manner as to be rocked about said pivots by movement of said mountings in a direction to loosen said endless belts, spring means confined by said levers and acted upon simultaneously by the latter to yieldably resist movement by said mountings in said mentioned direction, said spring means exerting less force tending to separate the wheels on each side of said vehicle than that force required to support either side of said vehicle solely through engagement of the unsupported lower run portion of the track on the same side of said vehicle with an object over which said lower run travels, means for imposing a preload tension on said spring means including a rotatable shaft having a screw-threaded connection with the spring means, whereby at least one end of said spring means moves axially on the shaft when the latter is rotated, a driven worm gear loosely mounted on the shaft, a driving worm in mesh with said worm gear, clutch means rotatably fixed but slidable on said shaft and engageable with the worm gear to lock the same for rotation with the shaft, and separate means for manually actuating said worm and said clutch means.

2. In a tractor vehicle, a pair of vehicle supporting wheels at each side of the vehicle, an endless track trained over and around each pair of wheels with its lower run unsupported between said wheels, a mounting for one wheel in each pair permitting bodily movement thereof longitudinally of said vehicle and relative to the other wheel with which it is associated, mechanism for urging said movable wheels constantly away from the other of said wheels and in a direction to tauten said endless tracks, said mechanism including levers pivoted on the vehicle and connected to said movable wheel mountings in such manner as to be rocked about said pivots by movement of the mountings, spring means for controlling each of said mountings, said spring means arranged transversely of the vehicle, fastened at the outer ends thereof to said levers and operative to resist movement of said wheel mountings in a direction to form slack in said endless tracks, said spring means exerting less force tending to separate the wheels on each side of said vehicle than that force required to support either side of said vehicle solely through engagement of the unsupported lower run portion of the track on the same side of said vehicle with an object over which said lower run travels and support means for the inner ends of said spring means.

3. The combination as set forth in claim 2 wherein a single support is provided for both of said spring means and wherein the support is mounted to move freely transversely of the vehicle.

4. In a tractor vehicle, a pair of vehicle supporting wheels at each side of the vehicle, and endless track trained over and around each pair of wheels with its lower run unsupported between said wheels, a mounting for one wheel in each pair permitting bodily movement thereof longitudinally of said vehicle and relative to the other wheel with which it is associated, mechanism for urging said movable wheels constantly away from the other of said wheels, said mechanism including levers pivoted on the vehicle and connected to said movable wheel mountings in such manner as to be rocked about said pivots by movement of said mountings, a support means arranged transversely of said levers free to move transversely of the vehicle, and a separate spring means for each lever carried by said support, the outer ends of said spring means confined by their respective levers and the inner ends thereof fastened to said support means, said spring means exerting less force tending to separate the wheels on each side of said vehicle than that force required to support either side of said vehicle solely through engagement of the unsupported lower run portion of the track on the same side of said vehicle with an object over which said lower run travels.

5. In a tractor vehicle, a pair of vehicle supporting wheels at each side of the vehicle, an endless track trained over and around each pair of wheels with its lower run unsupported between said wheels, a mounting for one wheel in each pair permitting bodily movement thereof longitudinally of said vehicle and relative to the other wheel with which it is associated, mechanism for urging said movable wheels constantly away from the other of said wheels, said mechanism including levers pivoted on the vehicle and connected to said movable wheel mountings in such manner as to be rocked about said pivots by movement of said mountings, a support means arranged intermediate said levers and free to move transversely of the vehicle, a separate spring means for each lever carried by said support, the outer ends of said spring means confined by their respective levers and the inner ends thereof fastened to said support means, said spring means exerting less force tending to separate the wheels on each side of said vehicle than that force required to support either side of said vehicle solely through engagement of the unsupported lower run portion of the track on the same side of said vehicle with an object over which said lower run travels, and means for adjusting the inner ends of said spring means relative to the confined outer ends thereof to impose a selected preload tension thereon.

6. In a tractor vehicle, a pair of vehicle supporting wheels at each side of the vehicle, an endless track trained over and around each pair of wheels with its lower run unsupported between said wheels, a mounting for one wheel in each pair permitting bodily movement thereof longitudinally of said vehicle and relative to the other wheel with which it is associated, mechanism for urging said movable wheels constantly away from the other of said wheels and in a direction to tauten said endless belts, said mechanism including levers pivoted on the vehicle and connected to said movable wheel mountings in such manner as to be rocked about said pivots by movement of said mountings, resilient means arranged transversely of the vehicle, a separate resilient means provided for each lever and each resilient means confined at one end by its respective lever, and support means mounted for unrestricted movement transversely of the vehicle frame and confining the other ends of said resilient means, each of said resilient means consisting of separate spring elements so constructed and arranged as to operate progressively when load is imposed thereon, whereby said resilient means yieldably resist movement of said mountings in a direction to permit slack to form in said endless tracks and whereby resistance afforded by said resilient means to movement of the mountings becomes progressively greater as the load imposed thereon increases, and resilient means exerting less force tending to separate the wheels on each side of said vehicle than that force required to support either side of said vehicle solely through engagement of the unsupported lower run portion of the track on the same side of said vehicle with an object over which said lower run travels.

7. In a tractor vehicle, a pair of vehicle supporting wheels at each side of the vehicle, an endless track trained over and around each pair of wheels with its lower run unsupported between said wheels, a mounting for one wheel in each pair permitting bodily movement thereof longitudinally of said vehicle relative to the other wheel with which it is associated, mechanism for urging said movable wheels constantly away from the other of said wheels and in a direction to tauten said endless belts, said mechanism including levers pivoted on the vehicle and connected to said movable wheel mountings in such manner as to be rocked about said pivots by movement of said mountings, resilient means arranged transversely of the vehicle, a separate resilient means being provided for each lever and each resilient means being fastened at its outer end to its respective lever, means providing a common support for the inner ends of said resilient means and mounted for unrestricted movement transversely of the vehicle frame, said support being fastened at the inner ends of said resilient means and holding said inner ends in fixed relation, each of said resilient means including a plurality of spring elements disposed transversely of the vehicle, said spring elements arranged in end-to-end relation and of progressively increasing size, and spacers separating said spring elements slidably mounted on said support means, said resilient means exerting less force tending to separate the wheels on each side of the vehicle than that force required to support either side of said vehicle solely through engagement of the unsupported lower run portion of the track on the same side of said vehicle with an object over which said lower run travels.

8. In a tractor vehicle, a pair of vehicle supporting wheels at each side of the vehicle, an endless track trained over and around each pair of wheels with its lower run unsupported between said wheels, a mounting for one wheel in each pair permitting bodily movement thereof longitudinally of said vehicle and relative to the other wheel with which it is associated, mechanism for urging said movable wheels constantly away from the other of said wheels, said mechanism including a pair of pivoted levers at opposite sides of the vehicle connected to respective wheel mountings in such manner as to be rocked about said pivots by movement of said mountings in a direction to form slack in said endless tracks, a rodlike element pivoted to the vehicle intermediate said levers, spring means around and fastened at one end to said rodlike element and movable therewith about said pivot, said spring means comprising a plurality of separate spring elements arranged in end-to-end relation and increasing progressively in size and strength from one end of the series to the other, spacers separating certain spring elements slidably mounted on said rodlike element, a rocker arm fastened to the other end of said spring means, and links connecting the ends of said rocker arm to respective levers, whereby a single spring means is operative to control both of said levers and to yieldably resist independent or simultaneous movement of said wheel mountings in a direction to form slack in said endless tracks, said spring means exerting less force tending to separate the wheels on each side of said vehicle than that force required to support either side of said vehicle solely through engagement of the unsupported lower run portion of the track on the same side of said vehicle with an object over which said lower run travels.

9. In a tractor vehicle, a pair of vehicle supporting wheels at each side of the vehicle, an endless track trained over and around each pair of wheels with its lower run unsupported between said wheels, a mounting for one wheel in each pair permitting bodily movement thereof longitudinally of said vehicle and relative to the other wheel with which it is associated, mechanism for urging said movable wheels constantly away from the other of said wheels, said mechanism including a pair of pivoted levers at opposite sides of the vehicle connected to respective wheel mountings in such manner as to be rocked about said pivots by movement of said mountings in a direction to form slack in said endless tracks, means controlling movement of said levers including a rodlike element pivoted to the vehicle intermediate said levers, spring means around and fastened at one end to said rodlike element and movable therewith about said pivots, a rocker arm fastened to the other end of said spring means, and links connecting the ends of said rocker arm to respective levers, said spring means comprising a plurality of separate spring elements arranged in series relation and increasing progressively in size and strength from one end of the series to the other, and spacers separating said spring elements, the endmost spacer adjacent the pivot about which the rodlike element swings normally being fixed to but longitudinally adjustable on said rodlike element, the other of said spacers being slidable on the rodlike element and endmost spacer remote from the pivot about which the rodlike element swings being fastened to said rocker arm, whereby a single spring means is operative to control both of said levers and to yieldably resist independent or simultaneous movement of said wheel mountings in a direction to form slack in said endless tracks, said spring means exerting less force tending to separate the wheels on each side of said vehicle than that force required to support either side of said vehicle solely through engagement of the unsupported lower run portion of the track on the same side of said vehicle with an object over which said lower run travels.

HARRY V. TUTTON.

REFERENCES CITED

The following references are of record in the file of this patent:

UNITED STATES PATENTS

| Number | Name | Date |
|---|---|---|
| 1,429,589 | Helm | Sept. 19, 1922 |
| 1,800,221 | Knox | Apr. 14, 1931 |
| 2,452,671 | Merrill | Nov. 2, 1948 |